US007069563B2

(12) United States Patent
Huang et al.

(10) Patent No.: US 7,069,563 B2
(45) Date of Patent: Jun. 27, 2006

(54) DISC DATA STORAGE APPARATUS WITH STRUCTURE FOR PREVENTING CRACKED DISC FROM JETTING OUT

(75) Inventors: Chiu-An Huang, Yunlin (TW); Hsien-Tsung Chiu, Taoyuan (TW); Yi-Ling Lee, Jhongli (TW)

(73) Assignee: Benq Corporation, Taoyuan (TW)

( * ) Notice: Subject to any disclaimer, the term of this patent is extended or adjusted under 35 U.S.C. 154(b) by 244 days.

(21) Appl. No.: 10/690,371

(22) Filed: Oct. 21, 2003

(65) Prior Publication Data

US 2004/0081056 A1    Apr. 29, 2004

(30) Foreign Application Priority Data

Oct. 25, 2002    (TW) .................. 91124968 A

(51) Int. Cl.
*G11B 17/04* (2006.01)
(52) U.S. Cl. ..................................... 720/601
(58) Field of Classification Search ............... 720/646, 720/647, 610, 601
See application file for complete search history.

(56) References Cited

U.S. PATENT DOCUMENTS

| | | | |
|---|---|---|---|
| 6,618,339 B1 * | 9/2003 | Sugita et al. ............... 720/647 |
| 6,918,128 B1 * | 7/2005 | Hasegawa et al. .......... 720/647 |
| 2002/0122372 A1 | 9/2002 | Chean-Pin Shih | |
| 2004/0107425 A1 * | 6/2004 | Huang ........................ 720/610 |

FOREIGN PATENT DOCUMENTS

| JP | 60055576 A * | 3/1985 |
|---|---|---|
| JP | 2001-236775 | 8/2001 |

* cited by examiner

*Primary Examiner*—Tianjie Chen
(74) *Attorney, Agent, or Firm*—Snell & Wilmer L.L.P.

(57) ABSTRACT

The present invention relates to a disc data storage apparatus with a structure for preventing cracked discs from jetting out. The disc data storage apparatus has a tray for receiving a disc, a cover and a housing. The cover has a first portion and a second portion. The first portion is connected to a front flange of the housing, and the second portion is extended into the housing to form a barrier portion. When a disc cracks, the barrier portion is configured to stop and prevent the cracked disc from jetting out.

16 Claims, 4 Drawing Sheets

DISC DATA STORAGE APPARATUS WITH STRUCTURE FOR PREVENTING CRACKED DISC FROM JETTING OUT

CROSS REFERENCE TO RELATED APPLICATION

This application claims priority of Taiwan Patent Application Serial No. 091124968 entitled "Disc Data Storage Apparatus with Structure for Preventing Crack Disc from Being Jetted Out", filed Dec. 2, 2002.

FIELD OF INVENTION

The present invention provides a disc data reading apparatus for preventing ejection of cracked discs.

BACKGROUND OF THE INVENTION

As the optical disc device technology develops, the speed and performance of the optical disc device become higher and higher. The quality of discs on the market, however, is not always good enough for high performance. A cracked disc often ejects out of the device and even hurts users. Therefore, an effective design for preventing ejection of the cracked disc is a focus of the modern optical disc device technology.

FIG. 1a illustrates a disc data reading apparatus of the prior art. FIG. 1b shows a cross-sectional view of the disc data reading apparatus. The cracked disc often passes through the opening between a tray 100 and a housing 200. Then, the cracked disc breaks a panel 720 of the cover 700, and jets out of the disc data reading apparatus. Conventionally, downwardly-bent end of a front flange 240 becomes a blocking device 260 to prevent ejection of the cracked disc. The blocking device 260 blocks the ejecting cracked disc due to the strength of the housing 200.

However, the blocking device 260 is located in an upper position of the housing 200 and there is still an opening below the blocking device 260. If the cracked disc ejects out through the opening, it would dash against the cover 700 and the panel 720. The material of the cover 700 and the panel 720 usually doesn't have enough strength to block the cracked disc.

Moreover, the cracking of the disc is often accompanied by a strong force. The force usually downwardly pushes the tray 100 to expand the opening. In this situation, the cracked disc ejects out from below the blocking device 260.

SUMMARY OF THE INVENTION

One aspect of the present invention is to provide a disc data reading apparatus for preventing ejection of a cracked disc.

Another aspect of the present invention is to provide a disc data reading apparatus for reducing the force caused by the cracking of the disc.

The present invention provides a disc data reading apparatus including a tray, a cover, and a housing. The tray includes a recess for receiving a disc and the recess defines a recess flange. The cover includes a first portion and a second portion. The second portion extends into the housing to form a barrier portion. When a disc cracks in the disc data reading apparatus, the barrier is provided to prevent the cracked disc from jetting out.

If the barrier portion does not block the cracked disc, the cracked disc would enter an opening between the tray and the barrier portion. The barrier portion and the tray provide friction to prevent the cracked disc from jetting out through the opening therebetween.

Moreover, the barrier portion includes a guidance surface sloping at a predetermined angle to guide the movement of the cracked disc upward and prevent the cracked disc from jetting out.

BRIEF DESCRIPTION OF THE DRAWINGS

FIG. 1b is a cross-sectional view of the disc data reading apparatus illustrated in FIG. 1a;

DETAILED DESCRIPTION

The present invention provides a disc data reading apparatus. When a disc cracks in the disc data reading apparatus, the present invention prevents the ejection of the cracked disc. The disc data reading apparatus mentioned here are Compact Disc Drive, Compact Disc Recordable Drive, Compact Disc Rewritable Drive, Digital Versatile Disc Drive, Digital Versatile Disc Recordable Drive, Digital Versatile Disc Rewritable Drive, or any other apparatus with similar functions and structures. Some of the preferred embodiments of the present inventions are described bellow.

FIRST EMBODIMENT

Figure 1A:
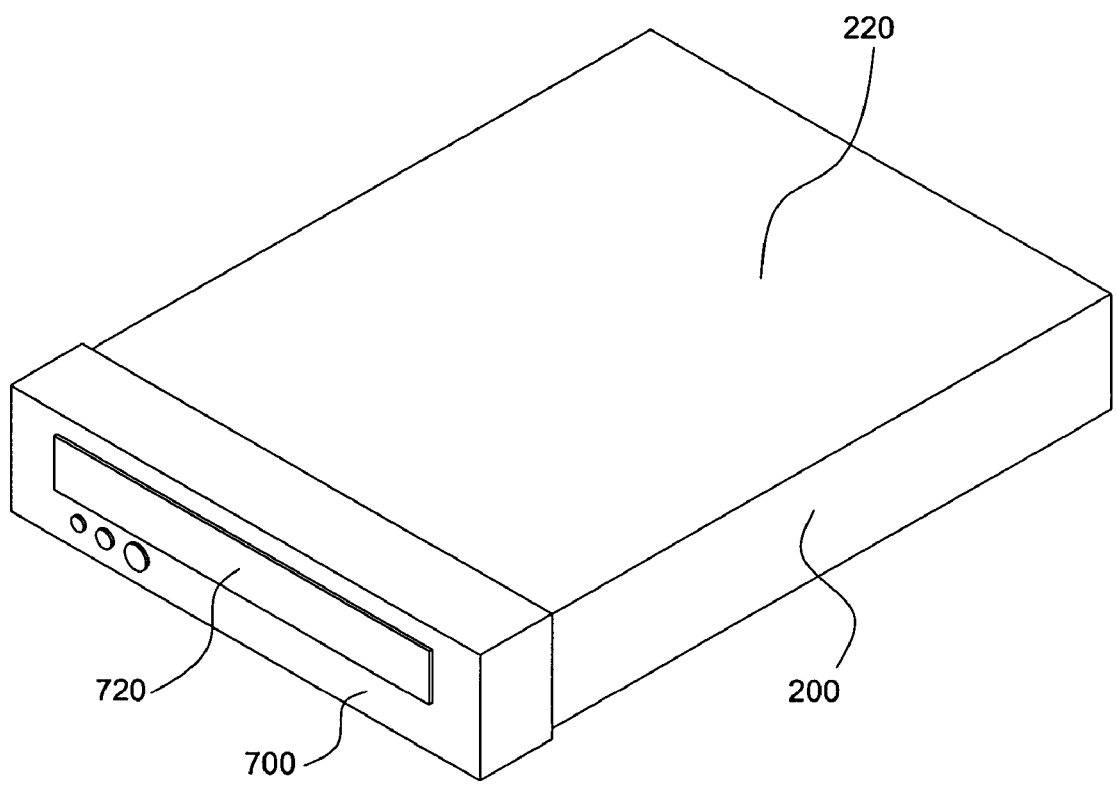
FIG. 1a illustrates a disc data reading apparatus of the prior art.
Figure 1B:
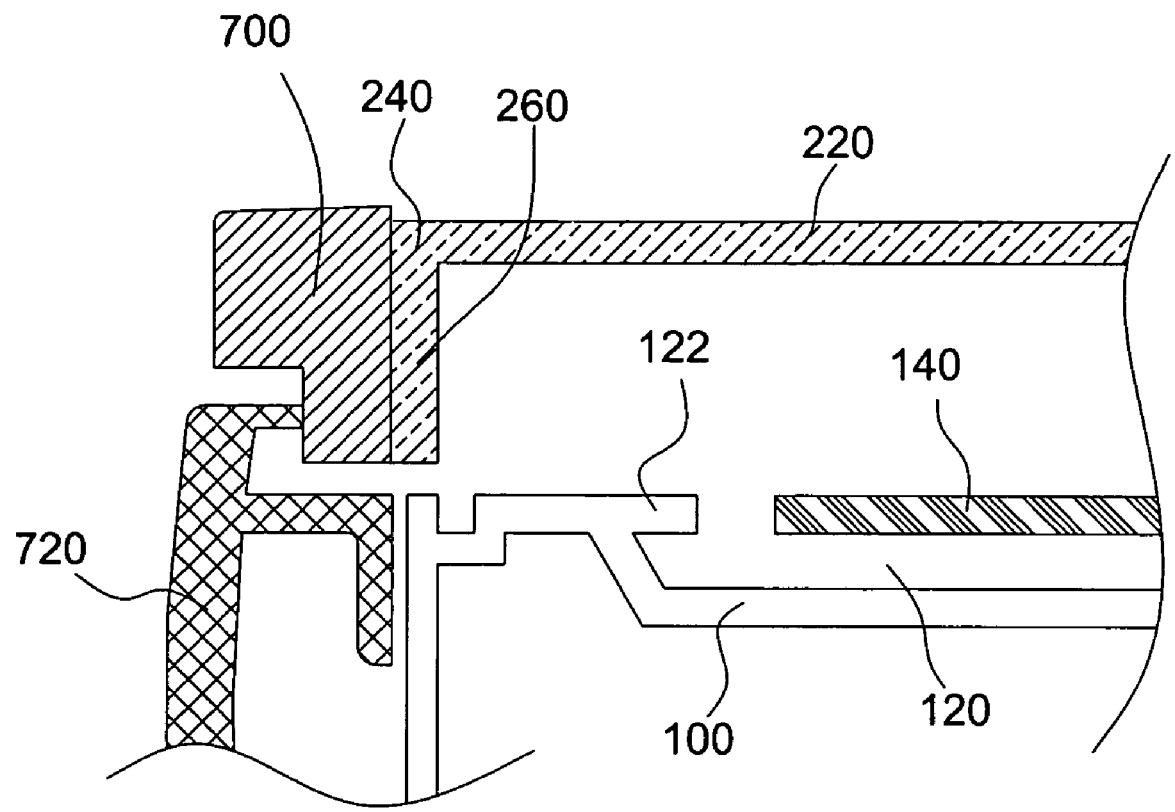
Figure 2:
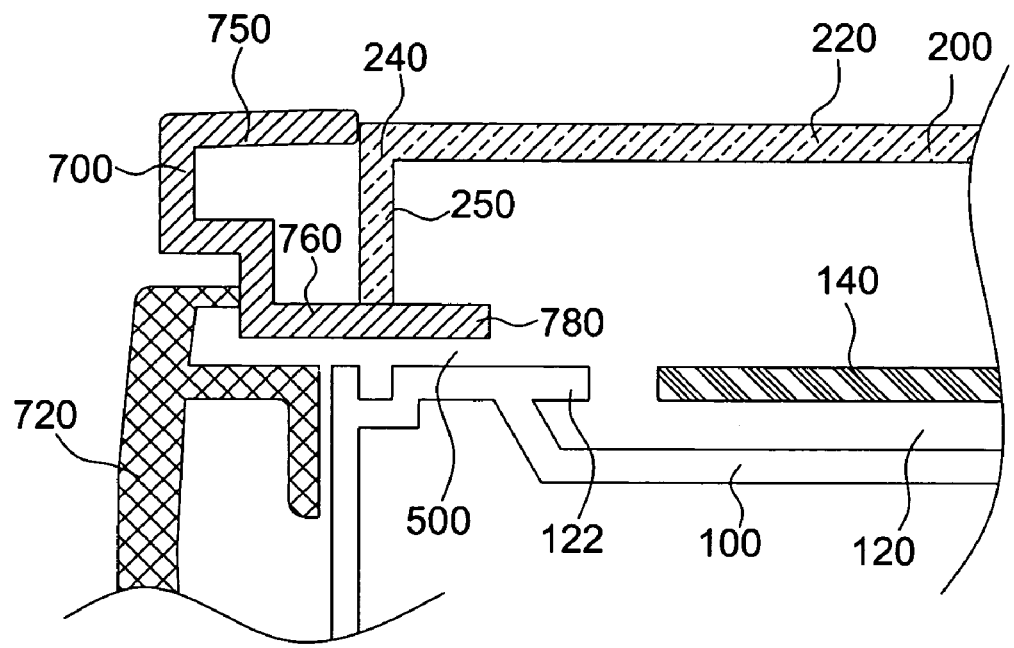
FIG. 2 is a cross-sectional view of a disc data reading apparatus in accordance with the first embodiment of the present invention.

FIG. 2 shows a disc data reading apparatus in accordance with the present invention. The disc data reading apparatus includes a tray 100, a housing 200, and a cover 700. The tray 100 includes a recess 120 for receiving a disc 140, and the recess 120 defines a recess flange 122. The tray 100 is made of plastic material in this embodiment. However, the tray 100 can be made of other materials, such as metal, polymer, glass, and so on.

As shown in FIG. 2, the housing 200 includes an upper plate 220 parallel to the tray 100, and the upper plate 220 has a front flange 240 and a bent portion 250. The upper plate 220 is made of metal in this embodiment, but can be plastic material, polymer, glass, or other materials with similar functions in other embodiments. The bent portion 250 downwardly extends from the upper plate 220 and is perpendicular to the tray 100. When the disc 140 cracks in the disc data reading apparatus, the bent portion 250 blocks the cracked disc 140 from jetting out. It should be noted that the bent portion 250 is perpendicular to the tray 100 in this embodiment, but the bent portion 250 can be positioned at other angles.

The cover 700 includes a first portion 750 and a second portion 760. The first portion 750 is connected to the front flange 240 of the housing 200, and the second portion 760 extends into the housing 200 to form a barrier portion 780. As shown in FIG. 2, an opening 500 becomes narrower, compared to similar openings in the prior art of disc reading apparatus, due to the presence of the barrier portion 780. The narrower opening 500 prevents the cracked disc 140 from jetting out. Moreover, even if the bent portion 250 and the barrier portion 780 cannot block the cracked disc 140 from entering the opening 500, the cracked disc 140 would continuously rub against the barrier portion 780 and the tray 100 due to the narrower opening 500. The friction helps the barrier portion 780 and the tray 100 to stop the cracked disc 140, or at least slow down the cracked disc 140, so that the cover 700 or a panel 720 can easily block the cracked disc 140.

In this preferred embodiment, the barrier portion 780 is located between the recess flange 122 and the front flange 240. The bent portion 250 of the upper plate 220 is also located between the recess flange 122 and the front flange 240.

SECOND EMBODIMENT

Figure 3:
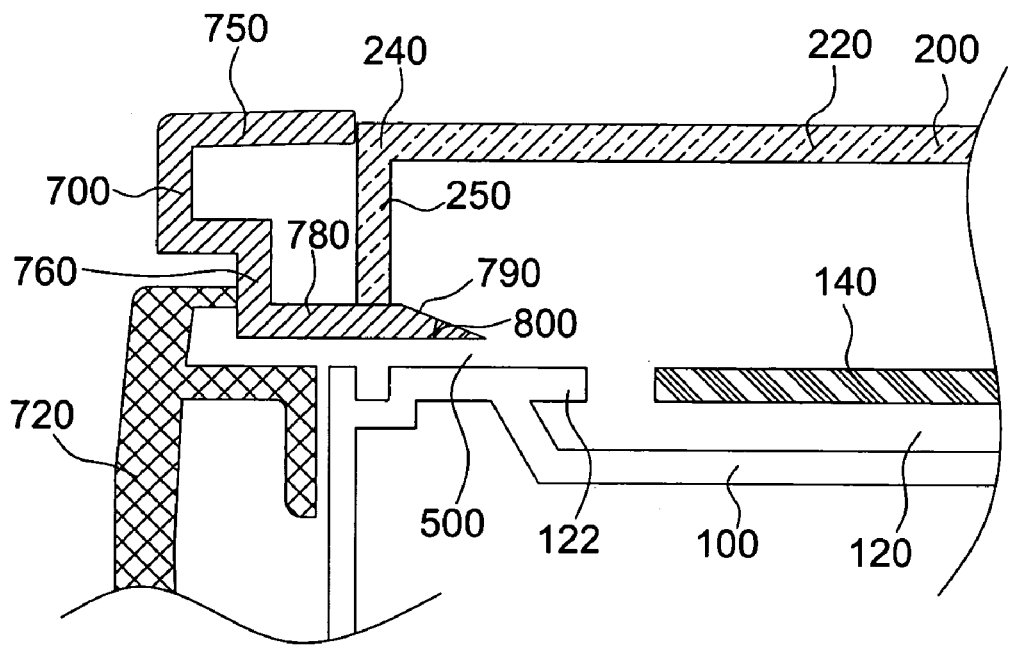
FIG. 3 is a cross-sectional view of a disc data reading apparatus in accordance with the second embodiment of the present invention.

FIG. 3 is a cross-sectional view of a second embodiment of the present invention. The second embodiment has the same essential units of the first embodiment. In the second embodiment, the barrier portion 780 further includes a guidance surface 790 sloping at a predetermined angle 800 to guide the movement of the cracked disc 140 upward and prevent the cracked disc 140 from jetting out. In this embodiment, the predetermined angle 800 is less than 90 degrees. When the guidance surface 790 guides the movement of the cracked disc 140 upward, the bent portion 250 blocks the cracked disc 140. The bent portion 250 is perpendicular to the upper plate 220 and the barrier portion 780 in this embodiment, but can be at other angles in other embodiments.

As shown in FIG. 3, an opening 500 becomes narrower, compared to the prior art openings, due to the presence of the barrier portion 780. The narrower opening 500 prevents the cracked disc 140 from jetting out. Moreover, even if the guidance surface 790 cannot successfully guide the cracked disc 140 upward and the cracked disc 140 enters the opening 500, the cracked disc 140 would continuously rub against the barrier portion 780 and the tray 100 due to the narrower opening 500. The friction helps the barrier portion 780 and the tray 100 to stop the cracked disc 140, or at least slow down the cracked disc 140, so that the cover 700 or a panel 720 can easily block the cracked disc 140.

THIRD EMBODIMENT

Figure 4:
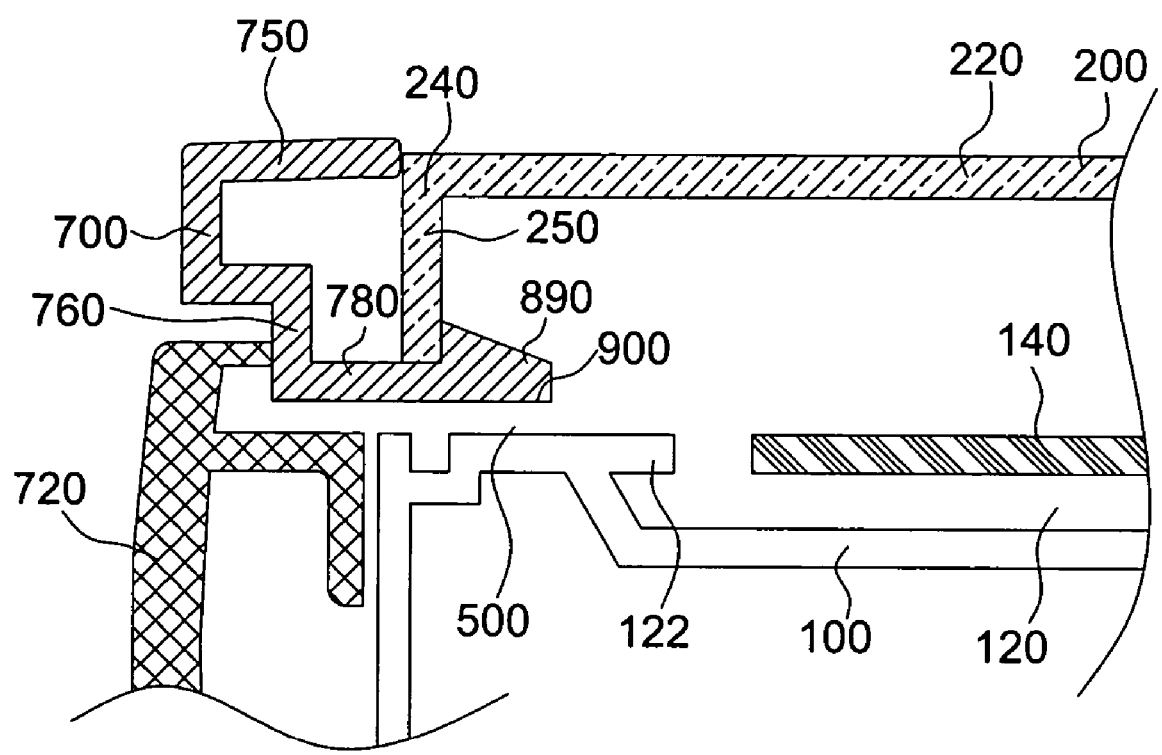
FIG. 4 is a cross-sectional view of a disc data reading apparatus in accordance with the third embodiment of the present invention.

FIG. 4 is a cross-sectional view of a third embodiment of the present invention. The third embodiment has the same essential units of the first embodiment. In the third embodiment, the barrier portion 780 further includes a clasp 900 engaging with the bent portion 250. When the cracked disc 140 dashes against the barrier portion 780, the clasp 900 provides an additional supporting force via the bent portion 250. The supporting force prevents the barrier portion 780 from being damaged by the cracked disc 140 and decreases the possibility of ejection of the cracked disc 140. Furthermore, the clasp 900 includes a guidance surface 890 for guiding the movement of the cracked disc 140 upward and prevents the cracked disc 140 from jetting out.

As shown in FIG. 4, an opening 500 becomes narrower, compared to the prior art openings, due to the presence of the barrier portion 780. The narrower opening 500 prevents the cracked disc 140 from jetting out. Moreover, even if the guidance surface 890 cannot successfully guides the cracked disc 140 upward and the cracked disc 140 enters the opening 500, the cracked disc 140 would continuously rub against the barrier portion 780 and the tray 100 due to the narrower opening 500. The friction helps the barrier portion 780 and the tray 100 to stop the cracked disc 140, or at least slow down the cracked disc 140, so that the cover 700 or a panel 720 can easily block the cracked disc 140.

The spirit and scope of the present invention can be clearly understood by the above detail descriptions of the prefer embodiments. The embodiments are not intended to limit the scope of the invention. Contrarily, various modifications of the illustrative embodiments, as well as other embodiments of the invention, will be apparent to persons skilled in the art upon reference to this description. It is therefore contemplated that the appended claims will cover any such modifications or embodiments as falling within the true scope of the invention.

We claim:

1. A disc data reading apparatus, comprising:
    a tray having a recess for receiving a disc, the recess defining a recess flange;
    a housing including an upper plate parallel to the tray, the upper plate having a front flange; and
    a cover including an opening, a first portion and a second portion, the tray being moved in and apart from the housing through the opening, the first portion protruding from the cover to connect to the front flange of the housing, and the second portion protruding from the cover and being longer than the first portion, and at least part of the second portion extending into the housing to form a barrier portion facing and substantially parallel to the tray;
    wherein the barrier portion prevents a possible cracked disc from jetting out.

2. The disc data reading apparatus of claim 1, wherein the barrier portion is located between the recess flange and the cover.

3. The disc data reading apparatus of claim 1, wherein the barrier portion and the tray prevent the cracked disc from jetting out through the opening.

4. The disc data reading apparatus of claim 1, wherein the barrier portion further includes a guidance surface sloping at a predetermined angle to upwardly guide a movement of the cracked disc.

5. The disc data reading apparatus of claim 4, wherein the predetermined angle is less than 90 degrees.

6. The disc data reading apparatus of claim 1, wherein the upper plate further includes a bent portion downwardly extending from the upper plate.

7. The disc data reading apparatus of claim 6, wherein the bent portion is located between the recess flange and the front flange.

8. The disc data reading apparatus of claim 6, wherein the barrier portion further includes a clasp engaging with the bent portion.

9. The disc data reading apparatus of claim 8, wherein the clasp further includes a guidance surface sloping at a predetermined angle to guide a movement of the cracked disc and prevent the cracked disc from jetting out.

10. A disc data reading apparatus, comprising:
    a tray having a recess for receiving a disc, the recess defining a recess flange;
    a housing including an upper plate parallel to the tray, the upper plate having a front flange; and
    a cover including an opening, a first portion and a second portion, the tray being moved in and apart from the housing through the opening, the first portion being connected to the front flange of the housing, and at least a part of the second portion extending into the housing to form a barrier portion having a sharp end;

wherein the sharp end of the barrier portion has a guidance surface upwardly sloping at a predetermined angle to upwardly guide a movement of a possible cracked disc and prevent the cracked disc jetting out from the opening.

11. The disc data reading apparatus of claim 10, wherein the barrier portion is located between the recess flange and the cover.

12. The disc data reading apparatus of claim 10, wherein the barrier portion and the tray prevent the cracked disc from jetting out through an opening between the barrier portion and the tray.

13. A disc data reading apparatus, comprising:

a tray having a recess for receiving a disc, the recess defining a recess flange;

a housing including an upper plate parallel to the tray, the upper plate having a bent portion and a front flange, the bent portion downwardly extending from the upper plate; and a cover including an opening, a first portion and a second portion, the tray being moved in and apart from the housing through the opening, the first portion being connected to the front flange of the housing, and at least part of the second portion extending into the housing to form a barrier portion, the barrier having a clasp engaging with the bent portion to provide an additional supporting force;

wherein the clasp has a guidance surface sloping at a predetermined angle to upwardly guide a movement of a possible cracked disc and prevent the cracked disc jetting out from the opening.

14. The disc data reading apparatus of claim 13, wherein the barrier portion is located between the recess flange and the cover.

15. The disc data reading apparatus of claim 13, wherein the barrier portion and the tray prevent the cracked disc from jetting out through an opening between the barrier portion and the tray.

16. The disc data reading apparatus of claim 13, wherein the bent portion is located between the recess flange and the front flange.

* * * * *